(12) United States Patent
Hass et al.

(10) Patent No.: US 7,890,311 B2
(45) Date of Patent: Feb. 15, 2011

(54) METHOD OF SIMULATING FLOW-THROUGH AREA OF A PRESSURE REGULATOR

(75) Inventors: Neal E. Hass, Yorktown, VA (US); Paul A. Schallhorn, Indialantic, FL (US)

(73) Assignee: United States of America as represented by the Administrator of the National Aeronautics and Space Adminstration, Washington, DC (US)

( * ) Notice: Subject to any disclaimer, the term of this patent is extended or adjusted under 35 U.S.C. 154(b) by 1622 days.

(21) Appl. No.: 11/177,664

(22) Filed: Jul. 7, 2005

(65) Prior Publication Data

US 2009/0287460 A1 Nov. 19, 2009

(51) Int. Cl.
*G06G 7/50* (2006.01)
*G06F 17/10* (2006.01)
*G05D 7/00* (2006.01)

(52) U.S. Cl. ................................ 703/9; 703/2; 700/282
(58) Field of Classification Search ...................... 703/9, 703/2; 700/282, 304
See application file for complete search history.

(56) References Cited

U.S. PATENT DOCUMENTS

| | | | | |
|---|---|---|---|---|
| 4,003,405 | A * | 1/1977 | Hayes et al. | 138/40 |
| 4,860,707 | A * | 8/1989 | Ohata | 123/339.2 |
| 6,748,349 | B1 * | 6/2004 | Majumdar et al. | 703/9 |
| 7,076,414 | B2 * | 7/2006 | Miyori | 703/9 |
| 7,096,093 | B1 * | 8/2006 | Hansen et al. | 700/282 |
| 7,266,427 | B2 * | 9/2007 | Hansen et al. | 700/282 |
| 2003/0144766 | A1 * | 7/2003 | Megan et al. | 700/301 |
| 2005/0246090 | A1 * | 11/2005 | Dingl et al. | 701/102 |
| 2005/0273204 | A1 * | 12/2005 | Hansen et al. | 700/282 |
| 2007/0288180 | A1 * | 12/2007 | Lull et al. | 702/50 |

OTHER PUBLICATIONS

El Golli Rami, Bezian Jean-Jacques, Grenouilleau Pascal, Menu Francois, Stability study and modelling of a pressure regulating station, Internatioanl Journal of Pressure Vessels and Piping, vol. 82, Issue 1, Jan. 2005, pp. 51-60, ISSN 0308-0161.*

(Continued)

*Primary Examiner*—Kamini S Shah
*Assistant Examiner*—Akash Saxena
(74) *Attorney, Agent, or Firm*—Helen M. Galus; Barry V. Gibbens; Robin W. Edwards

(57) ABSTRACT

The flow-through area of a pressure regulator positioned in a branch of a simulated fluid flow network is generated. A target pressure is defined downstream of the pressure regulator. A projected flow-through area is generated as a non-linear function of (i) target pressure, (ii) flow-through area of the pressure regulator for a current time step and a previous time step, and (iii) pressure at the downstream location for the current time step and previous time step. A simulated flow-through area for the next time step is generated as a sum of (i) flow-through area for the current time step, and (ii) a difference between the projected flow-through area and the flow-through area for the current time step multiplied by a user-defined rate control parameter. These steps are repeated for a sequence of time steps until the pressure at the downstream location is approximately equal to the target pressure.

8 Claims, 3 Drawing Sheets

OTHER PUBLICATIONS

"Pressure regulator valve by Bondgraph" by Katsuya Suzuki a, Ikuo Nakamura b, J.U. Thoma c;Simulation Practice and Theory 7 (1999) pp. 603-611; www.elsevier.nl/locate/simpra.*

"Modelling and dynamics of single-stage pressure relief valve with directional damping" by K. Dasgupta a,, R. Karmakar; Simulation Modelling Practice and Theory 10 (2002) pp. 51-67; www.elsevier.nl/locate/simpat.*

"A Generalized Fluid System Simulation Program to Model Flow Distribution in Fluid Networks" by Alok Majumdar, John W. Bailey, Paul Schallhorn and Todd Steadman; Draft paper for 34 th AIAA/ASME/SAE/ASEE Joint Propulsion Conference, Jul. 13-15, 1998, Cleveland, Ohio; pp. 1-14.*

Interfacing A General Purpose Fluid Network Flow Program With the Sinda/G Thermal Analysis Program by Paul Schallhorn and Daniel Popok 2000 pp. 1-12.*

P.A. Schallhorn, "Development of a Pressure Regulator Option for the Generalized Fluid System Simulation Program (GFSSP)," Report No. MG-02-111, NASA MSFC Contract No. NAS8-00187, Feb. 2002.

* cited by examiner

METHOD OF SIMULATING FLOW-THROUGH AREA OF A PRESSURE REGULATOR

ORIGIN OF THE INVENTION

The invention was made by employees of the United States Government and may be manufactured and used by or for the Government for governmental purposes without the payment of any royalties thereon or therefor.

BACKGROUND OF THE INVENTION

1. Field of the Invention

This invention relates to flow control device simulation. More specifically, the invention is a method of simulating the flow-through area of a pressure regulator based on a projected flow pressure downstream of the pressure regulator.

2. Description of the Related Art

Complex flow networks are frequently modeled so that fluid flow through such a network can be simulated. For example, nodes and branches can be used to model a flow network in a space that can be one, two, or three-dimensional. Nodes are positions within the flow network where fluid properties (e.g., pressure, density, etc.) are either known or calculated. Branches are portions of the flow network where flow conditions (e.g., geometry, flow rate, etc.) are known or calculated. One type of branch feature that requires modeling and simulation is a pressure regulator branch.

An actual pressure regulator is essentially a mechanical balance device. A feedback loop from the pressure regulator's output senses pressure downstream of the device. The sensed pressure is then used to drive the device's balance. When the sensed downstream pressure is less than a target pressure value, the balance is driven to increase the regulator's flow-through area. An increased flow-through area increases the flow rate into the downstream volume resulting in an increased sensed pressure. When sensed downstream pressure is greater than the target pressure value, the balance is driven to decrease the regulator's flow-through area. A decreased flow-through area decreases the flow rate to the downstream volume resulting in a decreased sensed pressure. If no flow rate is required, the flow-through area goes to zero once the sensed downstream volume is brought up to the target pressure value. If the sensed pressure never reaches the target pressure value, the flow-through area will eventually go to a user-specified maximum value. The rate at which a pressure regulator responds is a function of the downstream volume, the pressure difference between the target pressure value and the sensed pressure, and the stiffness of the balance.

An existing method for simulating a pressure regulator's flow-through area is based on a backwards-looking approach that uses the rate of area change in the recent past, a target regulation pressure, and a relaxation factor to determine the new flow-through area. The method is disclosed in detail in "Development of a Pressure Regulator Option for the Generalized Fluid System Simulation Program (GFSSP)," P. A. Schallhorn, Report No. MG-02-111, NASA MSFC Contract No. NAS8-00187, February 2002. Briefly, this method has an initial condition for flow-through area that is 50% of a user-specified maximum flow-through area. Further, this method zeroes the flow-through area when computed (downstream) pressure exceeds a target pressure. The disadvantages of this method include a false or forced start-up condition that leads to excessive start-up transients. The method also leads to numerically-unstable pressure regulation in highly transient systems due to area solutions that bounce around from zero to near convergence. However, neither of these situations is particularly demonstrative of the response of an actual pressure regulator.

SUMMARY OF THE INVENTION

Accordingly, it is an object of the present invention to provide a method of simulating the flow-through area of a pressure regulator.

Another object of the present invention is to provide a method that simulates flow-through area of a pressure regulator that more accurately depicts the start-up and transient responses of an actual pressure regulator.

Other objects and advantages of the present invention will become more obvious hereinafter in the specification and drawings.

In accordance with the present invention, a method is provided for simulating the flow-through area of a pressure regulator positioned in a branch of a simulated fluid flow network. A target pressure $P_T$ is defined at a location along the branch that is downstream of the pressure regulator. A projected flow-through area A' for a next time step (t+1) in a sequence of time steps is generated as follows $$A' = \left(A_t + dA * \left(\frac{dP}{(P_t - P_T + 0.01)}\right)\right) * \left(\frac{P_T}{P_t}\right)^3 * \left(e^{\left(\frac{P_T}{P_t}\right)-1} - \left(\frac{dP}{(P_T - dP)}\right)\right)^3$$

where
 $A_t$ is a flow-through area of the pressure regulator for a current time step t,
 dA is $(A_t - A_{t-1})$,
 $P_t$ is pressure at the downstream location for the current time step t, and
 dP is $(P_t - P_{t-1})$.

Next, a simulated flow-through area $A_{SIM}$ for is generated for the next time step (t+1) as follows $$A_{SIM} = A_{t-1} + R(A' - A_{t-1})$$

where R is a user-defined rate control parameter. The steps of generating are repeated until the pressure at the downstream location is approximately equal to the target pressure.

DETAILED DESCRIPTION OF THE INVENTION

Figure 1:
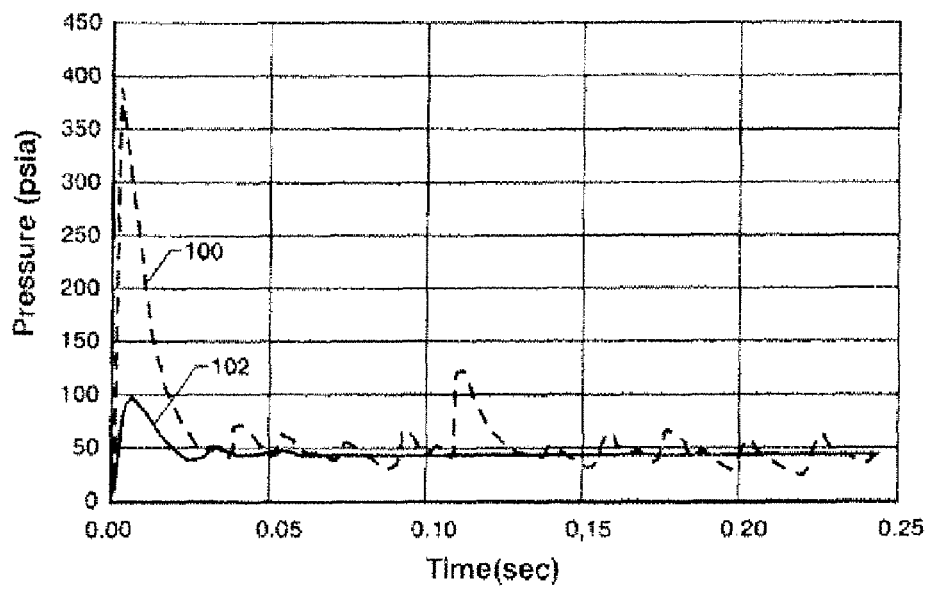
FIG. 1 is a graph of downstream pressure versus time for a first test simulation comparison between a prior art pressure regulator simulation scheme and that of the present invention.

In an effort to correct the problems that plague existing pressure regulator simulation schemes, the present invention applies a new prediction scheme. Observations and analysis of the start-up transients and time step changes to pressure regulated systems (from both blowdown and psuedo-infinite source experiments) indicate that a pressure regulator operates like a critically damped mechanical device (i.e., a spring-mass damped system) producing a variation of flow-through area. The present invention is based on the premise that the solution of the flow-through area must be a function of the difference between the target pressure and the current pressure at a location downstream of the pressure regulator.

In general, the present invention is a forward-looking approach to pressure regulator simulation that generates a new flow-through area for a (modeled) pressure regulator in a non-linear fashion using a target pressure, recent flow-through areas of the pressure regulator, and recent pressures in the flow system at a location downstream of the pressure regulator. The present invention predicts or projects what the pressure regulator's flow-through area will be at a next time step, and then uses a user-controlled percentage of a difference between the projected flow-through area and the current flow-through area to modify the current flow-through area.

The present invention is designed to operate in a fluid flow network simulation system in which the fluid flow network includes branches through which a fluid flow is simulated. More specifically, the method simulates flow-through area of a pressure regulator positioned in a branch of the fluid flow network. A target pressure PT is defined at a location along the branch that is downstream of the pressure regulator. The initial condition of the regulator area (i.e., $A_0$) is set to the maximum area of the component as specified by the user. This is based on the premise that when a regulator senses a downstream pressure that is orders of magnitude less than the target pressure, the regulator will try to assume a fully open position. A projected flow-through area A' is generated for a next time step (t+1) in a sequence of time steps according to the following relationship $$A' = \left(A_t + dA * \left(\frac{dP}{(P_t - P_T + 0.01)}\right)\right) * \left(\frac{P_T}{P_t}\right)^3 * \left(e^{\left(\frac{P_T}{P_t}\right)-1} - \left(\frac{dP}{(P_T - dP)}\right)\right)^3$$

where $A_t$ is a flow-through area of the pressure regulator for a current time step t, dA is a differential area defined as $(A_t - A_{t-1})$, $P_t$ is the "sensed" pressure at the downstream location for the current time step t, and dP is a differential pressure defined as $(P_t - P_{t-1})$.

Following the determination of the projected flow-through area A' for the next time step (t+1), a simulated flow-through area $A_{SIM}$ is generated for the next time step (t+1) according to the following relationship $$A_{SIM} = A_{t-1} + R(A' - A_{t-1})$$

where R is a user-defined rate control parameter.

The process of generating A' and $A_{SIM}$ is repeated for sequential time steps until the sensed pressure at the downstream location is approximately equal to the target pressure $P_T$.

The function of the various components of the projected flow-through area A' can be described briefly as follows:

(i) The first term is a differential area term that is added to the current area At acts as an accelerator or decelerator when the difference between the sensed downstream pressure $P_t$ and the target pressure $P_T$ is so small that the function cannot otherwise compute a small enough area change to maintain the pressure regulation. In essence, this term helps to stabilize the solution when the solution is very near convergence.

(ii) The second term is a ratio of the target pressure $P_T$ to current sensed pressure $P_t$. This term accelerates or decelerates the flow-through area change when the sensed pressure $P_t$ is far away from the target pressure $P_T$. The power term (e.g., 3 in the illustrated example) on this ratio controls the overall rate of flow-through area change while also permitting the rate to be positive (i.e., accelerate the rate) or negative (i.e., decelerate the rate). Tests of the present invention indicated that the power term should be at least 3, although parametrics run on the power term also indicated that no substantial improvements were achieved when the power term was greater than 3.

(iii) The third term is a differential term having an exponential term and a first order damping term. The exponential term provides for non-linear rates of change (i.e., either growth or attenuation) that allows the projected flow-through area A' to behave like an actual pressure regulator. The term subtracted from the exponential term is a first order damping term that prevents significant flow-through area overshoot when the difference between the target pressure $P_T$ and the differential pressure dP is very large. The power term (e.g., 3 in the illustrated example) on this differential term is what is necessary to make the damping aspect of the function effective. As was the case with the first term, tests revealed that the third term's power term should be at least 3, although parametrics run on the power term also indicated that no substantial improvements were achieved when the power term was greater than 3.

In terms of the simulated flow-through area $A_{SIM}$, the relaxation factor R is a user-defined rate control/restriction parameter (i.e., less than or equal to 1) that allows the user to further control flow-through area rates of changes. For systems that undergo significantly large orders of magnitude changes between (i) current and target pressures, (ii) possible area changes that are several orders of magnitude, and/or (iii) large time steps, adjusting the relaxation factor R can further enhance the rate of change to better mimic the response of an actual pressure regulator. For example, R will be larger for large mass flow systems because larger changes are expected between two sequential time steps, but R will be smaller for smaller mass flow systems where mass flow flux is expected to be relatively small between two sequential time steps.

Figure 2:
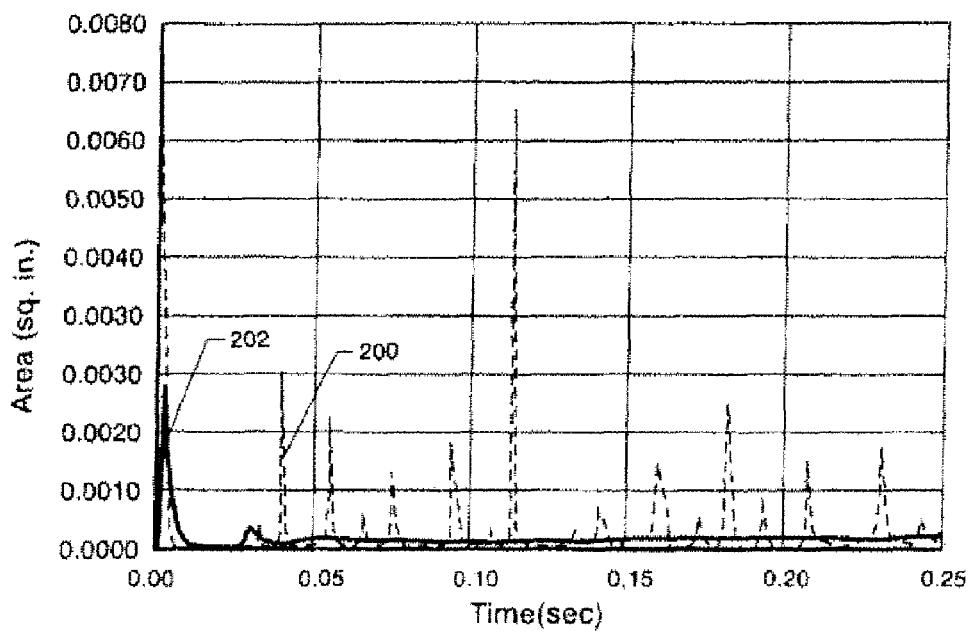
FIG. 2 is a graph of pressure regulator flow-through area versus time for the first test simulation comparison between a prior art pressure regulator simulation scheme and that of the present invention.

When compared to the previously-referenced, prior art pressure regulator simulation scheme, the present invention is an improvement thereover as evidenced by the following four case studies. In the first case, a simple flow network model is defined by a 600 psia source that is regulated down to 40 psia and then vented to atmospheric conditions through a 10 foot length of 0.1 inch tubing. A graph of the downstream sensed pressure versus time is shown in FIG. 1 where curve 100 depicts the simulation results using the prior art simulation scheme and curve 102 depicts the simulation results using the present invention. FIG. 2 depicts a graph of the pressure regulator's flow-through area where curve 200 depicts the simulation results using the prior art simulation scheme and curve 202 depicts the simulation results using the present invention. As is clearly evidenced by the graphs, the present invention's results are greatly improved over the prior art with respect to rate of convergence and stability.

Figure 3:
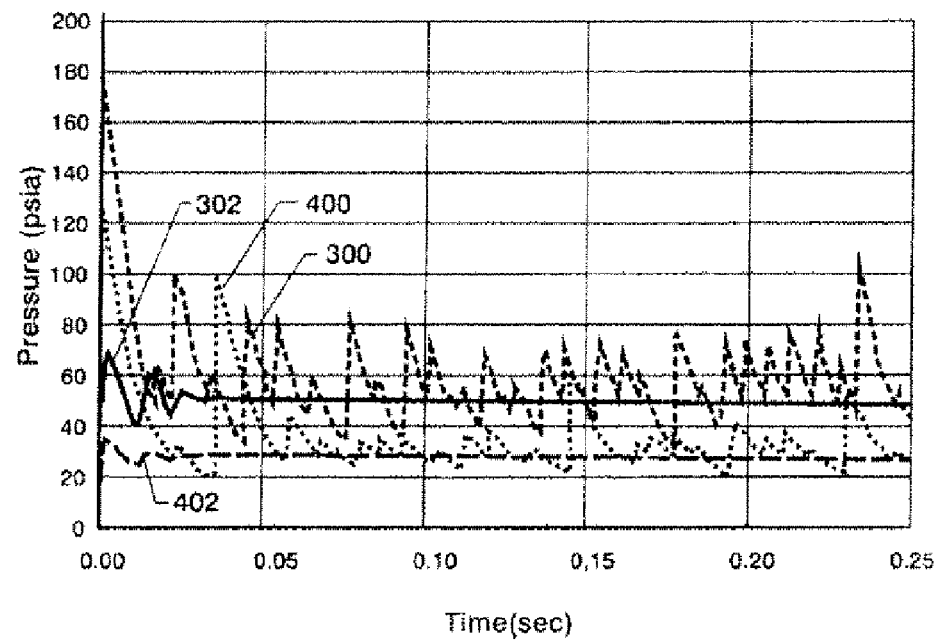
FIG. 3 is a graph of downstream pressure versus time for a second test simulation comparison between a prior art pressure regulator simulation scheme and that of the present invention.

A second case involves a flow network model defined by two pressure regulators operating in parallel with a 600 psia source. One regulator was set to regulate at 50 psia and the other was set to regulate at 27.5 psia. Both vent independently to atmospheric conditions through 10 foot tubes having 0.1 inch diameters. Referring to FIG. 3, curves 300 and 400 depict the results generated by the prior art for the regulators at 50 and 27.5 psia, respectively, while curves 302 and 402 depict the results generated by the present invention for the regulators at 50 and 27.5 psia, respectively. From this, it is clear that the results arrived at using the present invention's scheme exhibit improved convergence rate and stability when compared to the results arrived at using the prior art scheme.

Figure 4:
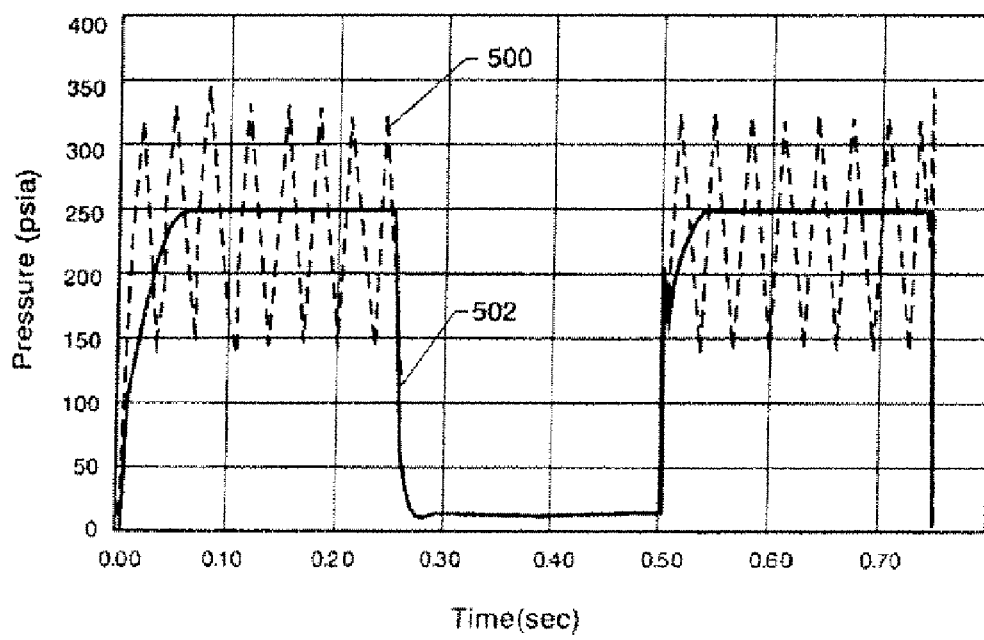
FIG. 4 is a graph of downstream pressure versus time for a third test simulation comparison between a prior art pressure regulator simulation scheme and that of the present invention.

A third case involves a flow network model defined by a 2200 psia source regulated down to 250 psia. The flow was then fed through a solenoid valve which was initially open, then closed after 0.25 seconds, and then re-opened at 0.5 seconds. The flow was vented to atmospheric conditions through a 1 foot long tube having a 0.2 inch diameter. Referring to FIG. 4, the convergence rate and stability of the sensed pressure upon the re-opening of the valve provided by the present invention (curve 502) is greatly improved when compared to the results using the prior art scheme (curve 500).

Figure 5:
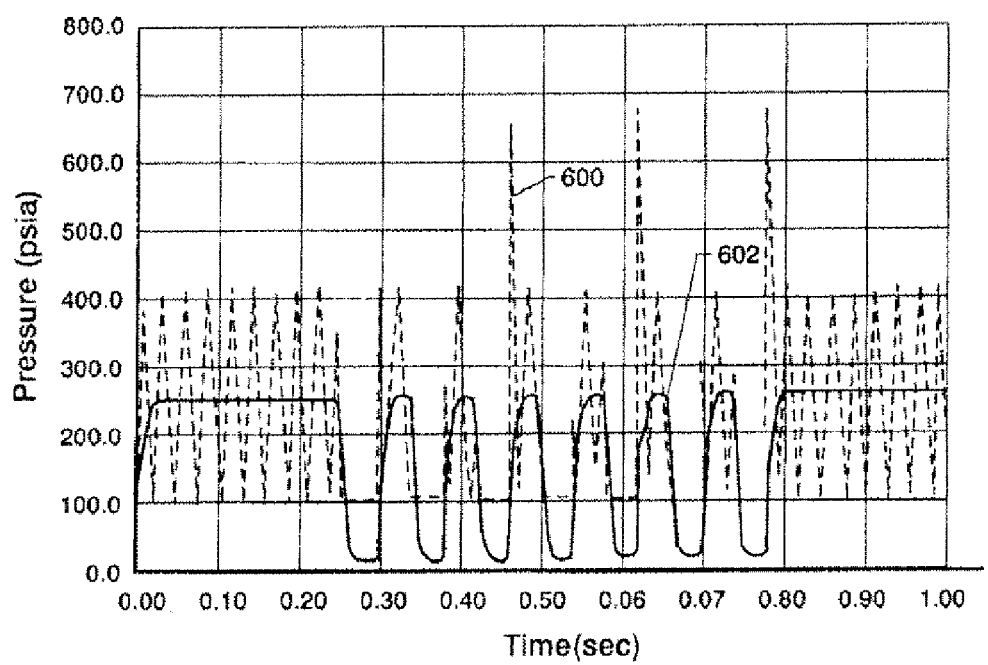
FIG. 5 is a graph of downstream pressure versus time for a fourth test simulation comparison between a prior art pressure regulator simulation scheme and that of the present invention.

A fourth case involves a flow network model defined by a 2200 psia source regulated down to 250 psia. Downstream of the regulator, a solenoid valve was vented to atmospheric conditions through a 1 foot long tube having a 0.2 inch diameter. The solenoid valve was initially opened and then closed at 0.25 seconds. The solenoid was then cycled open and closed at 25 Hz to obtain frequency response sensitivity information from the pressure regulator model. As shown in FIG. 5, only the present invention's results (curve 602) shows convergence and stability as the results based on the prior art simulation scheme (curve 600) never stabilize.

The advantages of the present invention are numerous. The present method does not require knowledge of the mechanical intricacies of a pressure regulator. Rather, only flow-through area and pressure are used to simulate pressure regulator operation. Test cases using the method have shown that the simulation responses more realistically represent how a pressure regulator converges to a solution of flow-through area for transient systems. Start-up transients are greatly reduced and solution stability is greatly improved compared to the prior art pressure regulator simulation method.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of simulating flow-through area of a pressure regulator positioned in a branch of a fluid flow network, said method comprising the steps of:

defining a target pressure at a location along the branch that is downstream of the pressure regulator;

generating a projected flow-through area for a next time step in a sequence of time steps, said projected flow-through area being a non-linear function of (i) said target pressure, (ii) a flow-through area of the pressure regulator for a current time step and a previous time step, and (iii) pressure at said location for said current time step and said previous time step, wherein said step of generating said projected flow-through area includes the step of generating a sum by adding said flow-through area for said current time step to a differential area term, said differential area term defined as the product of (i) a difference between said flow-through area for said current time step and said flow-through area for said previous time step, and (ii) a pressure ratio, wherein said pressure ratio is defined as a difference between said pressure at said location for said current time step and said pressure at said location for said previous time step relative to a difference between said pressure at said location for said current time step and said target pressure, and wherein said step of generating said projected flow-through area includes the step of controlling a rate of change of said projected flow-through area by multiplying said sum by a ratio of said target pressure to said pressure at said location for said current time step;

generating a simulated flow-through area for said next time step as a sum of (i) said flow-through area for said current time step, and (ii) a difference between said projected flow-through area and said flow-through area for said current time step multiplied by a user-defined rate control parameter; and repeating said steps of generating for a next sequential time step from said sequence of time steps until said pressure at said location is approximately equal to said target pressure, wherein said simulated flow-through area becomes said flow-through area for said current time step when performing said steps of generating for said next sequential time step.

2. A method according to claim 1 wherein said ratio is raised to a power prior to said step of multiplying.

3. A method according to claim 2 wherein said power is at least the power of 3.

4. A method according to claim 1 wherein said step of controlling includes the step of further multiplying said sum by an exponential term that includes an exponent based on said ratio.

5. A method according to claim 4 wherein said exponential term is raised to a power prior to said step of further multiplying.

6. A method according to claim 5 wherein said power is at least the power of 3.

7. A method of simulating flow-through area of a pressure regulator positioned in a branch of a fluid flow network, said method comprising the steps of:

defining a target pressure $P_T$ at a location along the branch that is downstream of the pressure regulator;

generating a projected flow-through area A' for a next time step (t+1) in a sequence of time steps as follows $$A' = \left(A_t + dA * \left(\frac{dP}{(P_t - P_T + 0.01)}\right)\right) * \left(\frac{P_T}{P_t}\right)^3 * \left(e^{\left(\frac{P_T}{P_t}\right)-1} - \left(\frac{dP}{(P_T - dP)}\right)\right)^3$$

where $A_t$ is a flow-through area of the pressure regulator for a current time step t, dA is $(A_t - A_{t-1})$, $P_t$ is pressure at said location for said current time step t, and dP is $(P_t - P_{t-1})$;

generating a simulated flow-through area $A_{SIM}$ for said next time step (t+1) as follows $A_{SIM} = A_{t-1} + R(A' - A_{t-1})$ where R is a user-defined rate control parameter; and repeating said steps of generating until said pressure at said location is approximately equal to said target pressure.

8. A method according to claim 7 further comprising the step of setting an initial flow-through area $A_0$ to a maximum value allowed for the flow-through area of the pressure regulator.

* * * * *